(12) United States Patent
Butzmann et al.

(10) Patent No.: US 9,048,513 B2
(45) Date of Patent: Jun. 2, 2015

(54) HYBRID BATTERY SYSTEM

(75) Inventors: Stefan Butzmann, Beilstein (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 805 days.

(21) Appl. No.: 13/384,762

(22) PCT Filed: Jun. 24, 2010

(86) PCT No.: PCT/EP2010/058973
§ 371 (c)(1),
(2), (4) Date: Apr. 5, 2012

(87) PCT Pub. No.: WO2011/009690
PCT Pub. Date: Jan. 27, 2011

(65) Prior Publication Data
US 2012/0181873 A1 Jul. 19, 2012

(30) Foreign Application Priority Data

Jul. 20, 2009 (DE) .................. 10 2009 027 835

(51) Int. Cl.
*H02J 7/00* (2006.01)
*H02J 1/00* (2006.01)
(Continued)

(52) U.S. Cl.
CPC .... *H01M 10/425* (2013.01); *H02M 2001/0077* (2013.01); *H02J 1/00* (2013.01);
(Continued)

(58) Field of Classification Search
CPC ................ H02J 7/00; H02J 1/00; H02J 3/00; H02M 2001/0077; H01M 10/425; B60L 11/1853; B60L 11/1864; B60L 11/007; Y02T 10/7005; Y02T 10/92; Y02T 10/7061
USPC ................. 320/116, 104, 120, 121, 124, 140; 307/36, 63, 77, 82; 363/13
See application file for complete search history.

(56) References Cited

U.S. PATENT DOCUMENTS

| | | | | |
|---|---|---|---|---|
| 4,155,112 A | * | 5/1979 | Miller et al. | 323/222 |
| 4,375,912 A | * | 3/1983 | Takahashi et al. | 396/165 |

(Continued)

FOREIGN PATENT DOCUMENTS

| | | |
|---|---|---|
| CN | 1885672 A | 12/2006 |
| JP | 11 113185 A | 4/1999 |
| WO | 2009128079 A1 | 10/2009 |

OTHER PUBLICATIONS

International Search Report corresponding to PCT Application No. PCT/EP2010/058973, mailed Sep. 22, 2010 (German and English language document) (4 pages).

*Primary Examiner* — Phallaka Kik
(74) *Attorney, Agent, or Firm* — Maginot, Moore & Beck LLP

(57) ABSTRACT

An energy transformer for a battery system is disclosed. The energy transformer includes a plurality of DC/DC converters each having a first and a second input and a first and a second output. The first output of a first of the DC/DC converters is connected to a first output of the energy transformer and the second output of a last of the DC/DC converters is connected to a second output of the energy transformer. The first and second inputs are designed for connecting a battery module. The DC/DC converters are connected in series on the output side. The energy transformer has a plurality of first diodes each of which have an anode connected to the first input of one of the DC/DC converters and a cathode connected to the second input of another DC/DC converter so that the DC/DC converters are connected in series on the input side and via a second diode having an anode connected to the first input of the first of the DC/DC converters and a cathode connected to the first output of the energy transformer.

11 Claims, 4 Drawing Sheets

(51) Int. Cl.
*H02J 3/00* (2006.01)
*H01M 10/42* (2006.01)
*B60L 11/18* (2006.01)
*B60L 15/00* (2006.01)
*H02M 1/00* (2006.01)

(52) U.S. Cl.
CPC ... *H02J 3/00* (2013.01); *H02J 7/00* (2013.01); *B60L 11/1853* (2013.01); *B60L 11/1864* (2013.01); *B60L 15/007* (2013.01); *Y02T 10/7005* (2013.01); *Y02T 10/92* (2013.01); *Y02T 10/7061* (2013.01)

(56) References Cited

U.S. PATENT DOCUMENTS

| | | | |
|---|---|---|---|
| 5,585,677 A * | 12/1996 | Cheon et al. | 307/64 |
| 5,744,936 A | 4/1998 | Kawakami | |
| 5,864,221 A * | 1/1999 | Downs et al. | 320/134 |
| 5,990,577 A * | 11/1999 | Kamioka et al. | 307/26 |
| 6,069,804 A * | 5/2000 | Ingman et al. | 363/21.14 |
| 6,504,340 B1 * | 1/2003 | Lee | 320/101 |
| 6,982,499 B1 * | 1/2006 | Kachi et al. | 307/75 |
| 7,800,346 B2 * | 9/2010 | Bolz et al. | 320/166 |
| 8,810,070 B2 * | 8/2014 | Butzmann | 307/83 |
| 2003/0080622 A1 * | 5/2003 | Koenig | 307/64 |
| 2005/0017682 A1 | 1/2005 | Canter et al. | |
| 2006/0261779 A1 * | 11/2006 | Maleus | 320/128 |
| 2008/0042493 A1 | 2/2008 | Jacobs | |
| 2008/0185994 A1 | 8/2008 | Altemose | |
| 2009/0096422 A1 * | 4/2009 | Trattler | 320/138 |
| 2010/0179023 A1 * | 7/2010 | Loudot et al. | 477/3 |
| 2011/0273024 A1 * | 11/2011 | Butzmann | 307/82 |
| 2012/0217797 A1 * | 8/2012 | Butzmann | 307/9.1 |
| 2012/0228931 A1 * | 9/2012 | Butzmann | 307/10.1 |

* cited by examiner

HYBRID BATTERY SYSTEM

This application is a 35 U.S.C. §371 National Stage Application of PCT/EP2010/058973, filed on Jun. 24, 2010, which claims the benefit of priority to Serial No. DE 10 2009 027 835.4, filed on Jul. 20, 2009 in Germany, the disclosures of which are incorporated herein by reference in their entirety.

BACKGROUND

There is an increasing demand for battery systems which are intended to be used in stationary applications such as wind power installations and standby power supply systems, or else in vehicles. All these applications place stringent requirements on the reliability and fail-safety. The reason for this is that complete failure of the voltage supply through the battery system can lead to a failure of the overall system. For example, in wind power installations, batteries are used in order to adjust the rotor blades when the wind is strong and to protect the installation against excessive mechanical loads, which could damage or even destroy the wind power installation. If the battery in an electric vehicle were to fail, it would become undriveable. A standby power supply system is in turn actually intended to ensure interruption-free operation, for example, of a hospital and therefore, as far as possible, cannot fail itself.

In order to make it possible to provide the power and energy required for the respective application, individual battery cells are connected in series, and in some cases additionally in parallel. FIG. 1 shows an outline circuit diagram of batteries connected in series. A multiplicity of battery cells 10-1 to 10-$n$ are connected in series in order to achieve the high operating voltage, as required for example for the electric motor in a passenger car, by addition of the voltages of the individual cells 10-1, . . . , 10-$n$. The high operating voltage can be decoupled by output-side switches 11-1 and 11-2 from the downstream power-electronic components, such as inverters, which are not illustrated. Since the total output current of the battery flows in each of the battery cells 10-1, . . . , 10-$n$ because the battery cells 10-1, . . . , 10-$n$ are connected in series, with the charge transport taking place by electrochemical processes within the battery cells 10-1, . . . , 10-$n$, the failure of a single battery cell means, in the extreme, that the entire arrangement can no longer provide any current and therefore no electrical energy. In order to allow a threatened failure of a battery cell 10-1, . . . , 10-$n$ to be identified in good time, a so-called battery management system 12 is normally used, which is or can be connected to both poles of each of the battery cells 10-1, . . . , 10-$n$ and determines operating parameters such as the voltage and temperature of each battery cell 10-1, . . . , 10-$n$ and, therefrom, their state of charge (SoC) at regular or selectable intervals. This means a high level of complexity with little flexibility at the same time for the electrical operating data of the battery system.

Further disadvantages of connecting a multiplicity of battery cells in series are:
1. Conditions are imposed for the operating voltage to be provided, the maximum current and the stored energy for various operating states of the device to be operated using the battery, which conditions can be combined only by coupling a greater number of battery cells than would actually be necessary to comply with the individual requirements. This increases the price, as well as the weight and volume of the battery system, which have a particularly disturbing effect in an electric car.
2. The installation of the battery, that is to say the interconnection of the individual cells, takes place at high voltages up to 1000 V, because the voltages of the individual battery cells are added by connecting them in series, as a result of which the battery, individual cells or modules cannot be replaced in local workshops or, in the case of stationary use, can be carried out only with a special tool by especially trained skilled workmen. This results in a high level of logistic effort for maintenance of battery systems in the event of a fault.
3. In order to switch the battery system to be free of voltage, that is to say to disconnect the actual battery from the load, circuit breakers 11-1 and 11-2 must be provided, which are typically in the form of contactors, and are very expensive for the high currents and voltages to be expected.

SUMMARY

The disclosure is based upon the object of introducing an apparatus which makes it possible to overcome the above-mentioned disadvantages of the prior art.

A first aspect of the disclosure relates to an energy transmitter for a battery system, which comprises a plurality of DC/DC converters in each case having a first and a second input and a first and a second output. The first output of a first of the DC/DC converters is connected to a first output of the energy transmitter, and the second output of the last of the DC/DC converters is connected to a second output of the energy transmitter. The first and second inputs of the DC/DC converters are designed for connection of a battery module. The DC/DC converters are connected in series on the output side. According to the disclosure, the energy transmitter has a plurality of first diodes, in each case one of which has an anode which is connected to the first input of one of the DC/DC converters, and a cathode which is connected to the second input of another DC/DC converter, such that the DC/DC converters are connected in series on the input side, as well as a second diode, which has an anode, which is connected to the first input of the first of the DC/DC converters, and a cathode, which is connected to the first output of the energy transmitter.

Features of the disclosure have the advantage that the battery modules are connected in series via the first diodes, and the battery modules which have been connected in series are connected in parallel with the DC/DC converters via the second diode. This makes it possible to design the DC/DC converters for a low power consumption, which is sufficient for most operating situations, as a result of which the DC/DC converters become lighter in weight and cost less. If a high power is consumed, the output voltage produced by the series-connected DC/DC converters will dip and will fall below the voltage of the series-connected battery modules. The battery modules are in consequence connected via the second diode, and once again stabilize the output voltage. Features of the disclosure allow a good compromise between different requirements for the power levels to be provided for various operating states. Furthermore, the choice of a total voltage which is suitable depending on the operating situation, subject to the precondition of the sufficiently low power consumption, is possible by appropriate control of the DC/DC converters. Even when the power consumption is low, the output voltage is independent of the number of battery cells connected on the primary side. This allows the battery system to be designed purely on the basis of energy and power criteria, independently of the total voltage required for the respective application. A further advantage of the arrangement is that the expensive contactors 11-1 and 11-2 can be dispensed with, because the high voltage of the battery output can be disconnected in a simple manner by disconnection of the DC/DC converters.

The energy transmitter may have a plurality of first decoupling switches, via in each case one of which the battery modules can be connected to the DC/DC converters. The first decoupling switches make it possible to decouple a battery module from the respective DC/DC converter, and therefore to switch this to be voltage-free. This prevents the battery module from being short-circuited, depending on a switching state of the DC/DC converter. The first decoupling switches are preferably in the form of relays.

In addition to the first decoupling switches, the energy transmitter may have a plurality of second decoupling switches, one of which is in each case connected in series with the first diodes and the second diode. The second decoupling switches are designed to decouple the first output of a respective DC/DC converter from the first input of the respective DC/DC converter, and to decouple the second input of each DC/DC converter, with the exception of the last DC/DC converter, from its second output. The second decoupling switches are preferably in the form of high-speed switches and ensure that the battery modules are decoupled in the situation when a first decoupling switch does not switch, or switches too slowly. This is particularly advantageous when the first decoupling switches are in the form of relays, which switch relatively slowly.

The DC/DC converters are particularly preferably in the form of bi-directional, non-isolating DC/DC converters, for example step-up/step-down converters, or Buck-Boost converters.

In one preferred embodiment of the energy transmitter, the DC/DC converters each have a coil, first to fourth switches and a controller for controlling the first to fourth switches, with the first switch being connected between the first input and a first connection of the coil, with the second switch being connected between the first connection of the coil and the second input, with the third switch being connected between a second connection of the coil and the second input, and with the fourth switch being connected between the second connection of the coil and the first output. This embodiment of a Buck-Boost converter has a low level of circuitry complexity and allows the output voltage to be produced to be controlled easily.

Particularly preferably, in this case, each controller has a first control input for a first control signal and is designed to electrically connect the first output of the DC/DC converter to the second output of the DC/DC converter by closing the third switch and the fourth switch, and to decouple the first input of the DC/DC converter by opening the first switch, in response to the reception of the first control signal. This embodiment makes it possible to selectively switch off a DC/DC converter during operation, for example because a battery cell in the battery module connected on the input side is defective. By closing the third switch the first and the second output of the DC/DC converter which has failed are conductively connected to one another, thus allowing an output current to still flow in the overall arrangement. In order not to short-circuit the battery module via the coil, it is at the same time decoupled by opening the first switch. This embodiment therefore makes it possible to continue to operate the apparatus despite the failure of one or more battery cells. Furthermore, it is possible to replace a battery module during operation, if necessary, without having to interrupt the production of the total voltage.

In a development of the two last-mentioned embodiment variants, each of the DC/DC converters has a second control input for a second control signal and is designed to increase a voltage between the first and the second outputs of the DC/DC converter in response to the reception of the second control signal. This makes it possible to counteract a reduction in the total voltage resulting from the already described disconnection of a single DC/DC converter, as a result of which a total voltage which is at least approximately unchanged is still provided by the reduced number of DC/DC converters. It is also possible to increase the total voltage of the remaining number of DC/DC converters, and thus match this to a different operating situation.

A second aspect of the disclosure introduces a battery system having an energy transmitter according to the first aspect of the disclosure and having a plurality of battery modules. The battery modules each have at least one battery cell. The battery poles of the battery modules are detachably connected to a corresponding input of the first and second inputs of a DC/DC converter of the energy transmitter.

A third aspect of the disclosure relates to a motor vehicle having an energy transmitter according to the first aspect of the disclosure.

BRIEF DESCRIPTION OF THE DRAWINGS

The disclosure will be explained in more detail in the following text with reference to illustrations of exemplary embodiments, in which.

DETAILED DESCRIPTION

Figure 1:
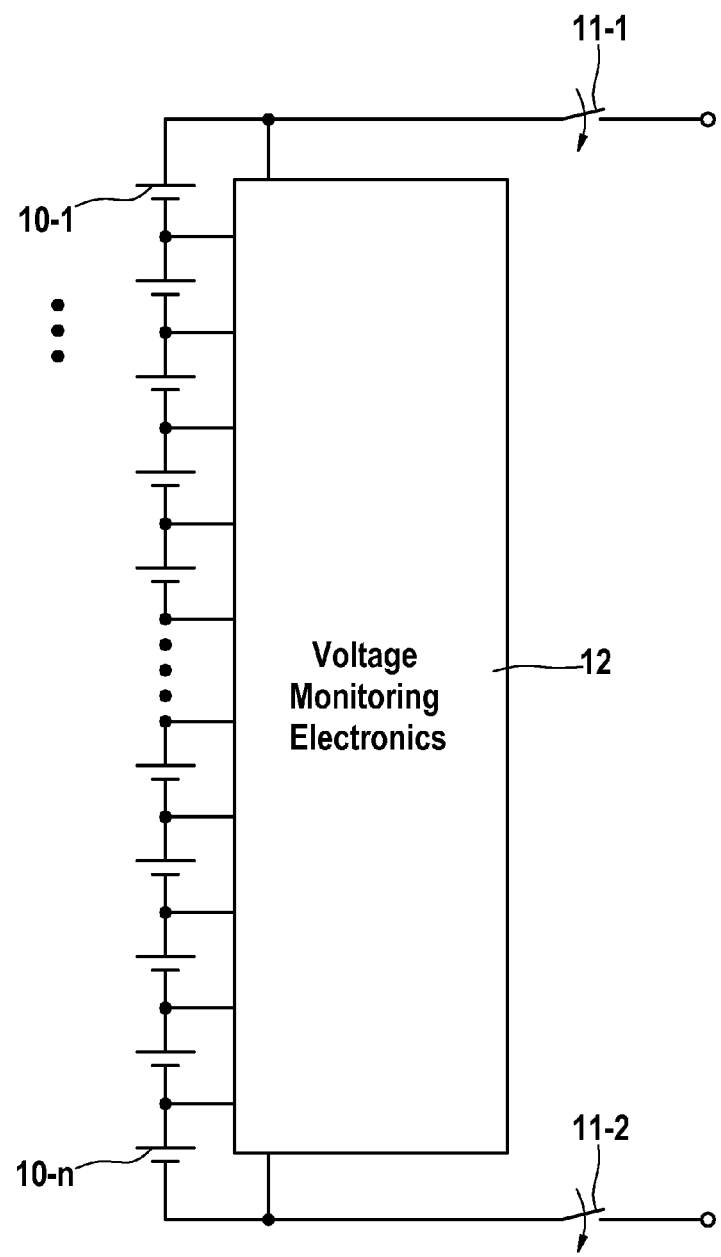
FIG. 1 shows a battery with a battery management system according to the prior art.
Figure 2:
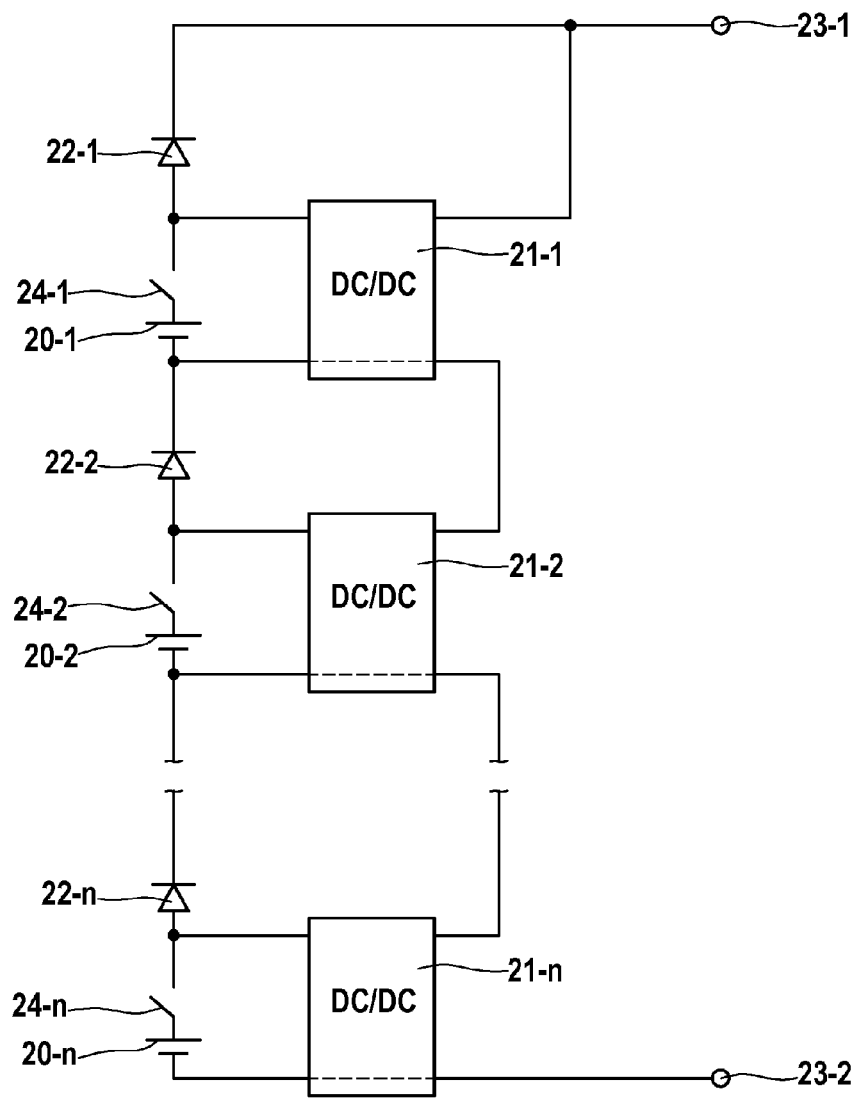
FIG. 2 shows a first exemplary embodiment of the disclosure.

FIG. 2 shows a first exemplary embodiment of the disclosure. A plurality of DC/DC converters 21-1, 21-2 to 21-*n* are connected in series on the input side via a plurality of first diodes 22-2 to 22-*n*. In addition, each of the DC/DC converters 21-1, 21-2, ..., 21-*n* is connected on the input side to a battery module 20-1, 20-2, ..., 20-*n*, each of which has one or more series-connected battery cells. As can be seen in FIG. 2, the outputs of the DC/DC converters 21-1, 21-2, ..., 21-*n* are connected in series, as a result of which the total voltage is produced between the outputs 23-1 and 23-2 of the arrangement as the sum of the individual voltages produced by the DC/DC converters 21-1, 21-2, ..., 21-*n*. The DC/DC converters 21-1, 21-2, ..., 21-*n* are designed in a known manner and make it possible to set the output voltage which is produced at the first and second outputs of each DC/DC converter 21-1, 21-2, ..., 21-*n*, or else to disconnect the DC/DC converters 21-1, 21-2, ..., 21-*n*, such that no further DC/DC conversion takes place. This allows the total voltage of the outputs 23-1 and 23-2 to be flexibly matched to the respective operating situation, representing one of the advantages of the disclosure. Dashed lines within the DC/DC converters 21-1, 21-2, ..., 21-*n* indicate a possible electrically conductive connection between in each case one input and one output of the DC/DC converters 21-1, 21-2, ..., 21-*n*. The battery modules 20-1, 20-2, ..., 20-*n* are connected in series via the first diodes 22-2, ..., 22-*n* and first decoupling switches 24-1, 24-2, ..., 24-*n*, and are connected in parallel with the first output of the first DC/DC converter 21-1 via a second diode 22-1. The battery which is assembled from the battery modules is therefore available in parallel with the series-connected DC/DC converters 21-1, 21-2, ..., 21-*n*. This makes it possible to design the DC/DC converters 21-1, 21-2, ..., 21-*n* for relatively low power consumptions, as a result of which the DC/DC converters 21-1, 21-2, . . . , 21-*n* are smaller, lighter and more cost-effective. For the operating states which normally occur only rarely and in which a higher power must be made available, the battery, which is connected in parallel as described, can be used directly as a source. Once such a higher power is consumed, the voltage which is produced by the DC/DC converters 21-1, 21-2, . . . , 21-*n* between the outputs 23-1 and 23-2 will collapse until the second diode 22-1 becomes forward-biased. The second diode 22-1 will then conduct and the battery will stabilize the voltage between the outputs 23-1 and 23-2. The disclosure therefore combines the advantages of variable production of the output voltage independently of the number of battery cells used with a maximum available output voltage which is still high, in which case a relatively low level of circuitry complexity can be achieved. The first decoupling switches 24-1, 24-2, . . . , 24-*n* make it possible to decouple the respective battery module 20-1, 20-2, . . . , 20-*n* from the associated DC/DC converter 21-1, 21-2, . . . , 21-*n*, and to switch this to be free of voltage. This is particularly useful in the case of a defect in a battery module 20-1, 20-2, . . . , 20-*n*. In a case such as this, the associated DC/DC converter 21-1, 21-2, . . . , 21-*n* should additionally be deactivated, with its outputs being short-circuited, in order to ensure further operation of the overall arrangement. Additionally or alternatively, an appropriate bypass circuit is also possible for the input side of the DC/DC converter, but can be omitted if the DC/DC converters 21-1, 21-2, . . . , 21-*n* have a conductive connection between the second input and the second output.

Figure 3:
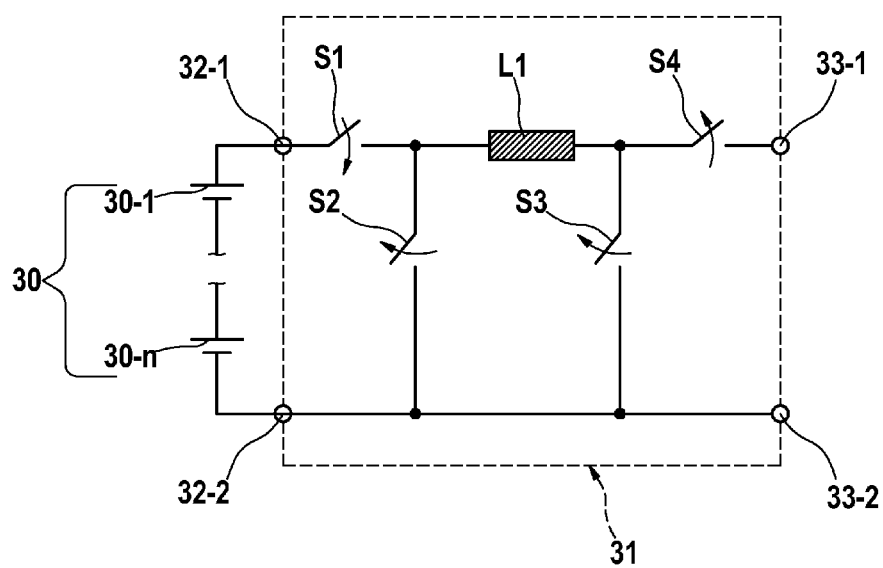
FIG. 3 shows a circuit diagram of a DC/DC converter in the form of a Buck-Boost converter.

FIG. 3 shows a circuit diagram of a known DC/DC converter 31, which is in the form of a Buck-Boost converter. A battery module 30 having one or more battery cells 30-1 to 30-*n* can be detachably connected between a first input 32-1 and a second input 32-2. The DC/DC converter 31 has first to fourth switches S1, S2, S3, S4 and a coil L1. The DC/DC converter has a first and a second output 33-1, 33-2 and is designed to produce a DC voltage between these outputs 33-1, 33-2, the magnitude of which DC voltage can be adjusted in a known manner by choice of the switching periods of the first to fourth switches S1, S2, S3, S4, independently of the DC voltage of the battery module 30. In the simplest case, the Buck-Boost converter is operated alternately in two different states. In a charging state, the first switch S1 and the third switch S3 are closed (that is to say they are switched on), and the second switch S2 and the fourth switch S4 are opened (that is to say they are switched off). In consequence, a current flows from the battery module 30 through the coil L1, building up a magnetic field in the coil L1. During a discharge process, the first switch S1 and the third switch S3 are now opened, and the second switch S2 and the fourth switch S4 are closed. The battery module 30 is therefore disconnected from the coil L1, and the input of said coil is connected to the negative pole of the battery module 30, while its output is connected to the first output 33-1. Since the coil L1 counteracts the change in the current flowing through it, it feeds an output current from its magnetic field, and in the process decreases this. If this process is repeated rapidly, a DC voltage is produced between the outputs 33-1, 33-2, the magnitude of which DC voltage is dependent, inter alia, on the frequency of repetition.

The figures do not show a controller which matches the clocking of the switches S1 to S4 to the operating situation. It is also normal to provide a feedback path in which the output voltage which is produced at the outputs 33-1, 33-2 is determined and is used for adaptation of the clocking of the switches S1 to S4, thus resulting in an output voltage which is as stable as possible. In order to provide better smoothing for the output voltage, a buffer capacitor can be provided between the outputs 33-1, 33-2. Within the scope of the disclosure, these characteristics of DC/DC converters make it possible to set a desired total voltage, depending on the operating situation, for the arrangement according to the disclosure, or else to disconnect one or all of the DC/DC converters. Particularly advantageously, the DC/DC converter 31 can be deactivated by closing the switches S3 and S4 and opening the switches S1 and S2.

Figure 4:
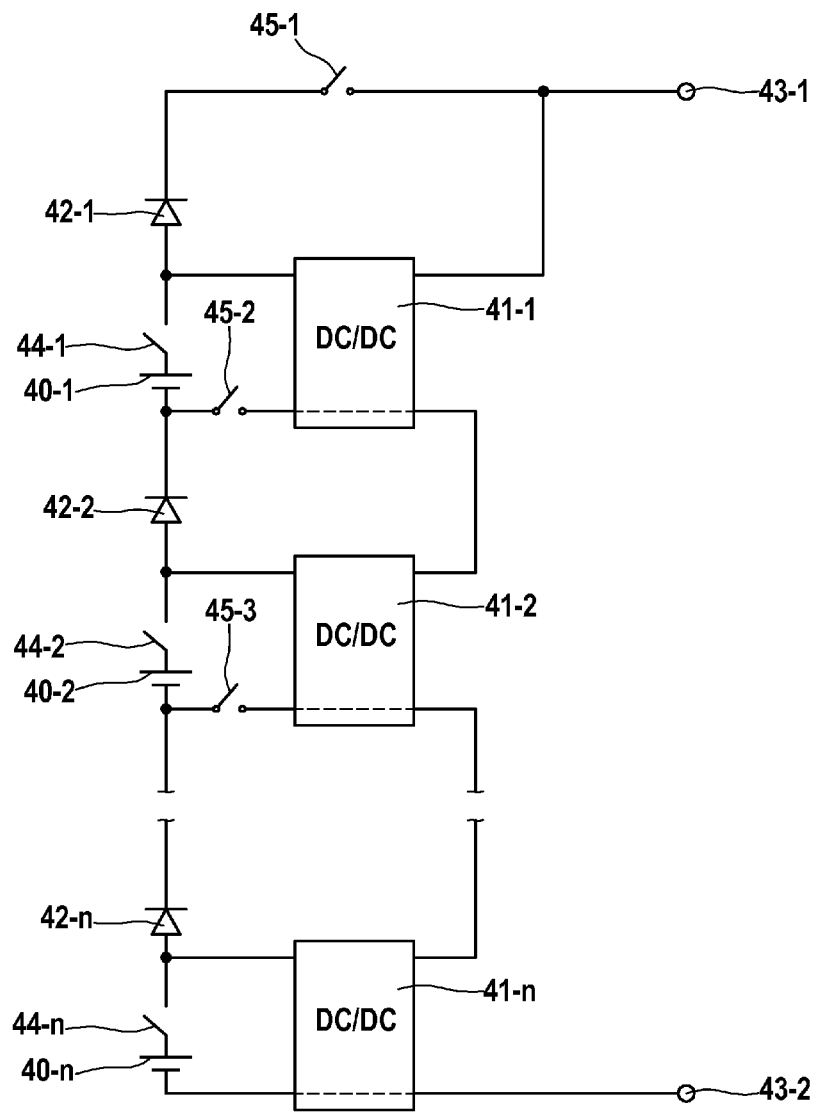
FIG. 4 shows a second exemplary embodiment of the disclosure.

FIG. 4 shows a second exemplary embodiment of the disclosure, which is designed in a similar manner to the first exemplary embodiment and operates in a corresponding manner. The only difference is that two decoupling switches 45-1, 45-2, 45-3 are additionally inserted, and are intended to interrupt the conductive connection, which is indicated by a dashed line within the DC/DC converter 41-1, 41-2, . . . , 41-*n*, between the second inputs and second outputs of the DC/DC converters 41-1, 41-2, . . . , 41-*n* for the situation in which one DC/DC converter 41-1, 41-2, . . . , 41-*n* is deactivated as described above because of a defect in a battery module 40-1, 40-2, . . . , 40-*n*. In this case, the second decoupling switches are preferably in the form of high-speed switches, such as power transistors, and can decouple the battery modules 40-1, 40-2, . . . , 40-*n* if one of the first decoupling switches 44-1, 44-2, . . . , 44-*n*, which are preferably in the form of relatively slow relays, does not open or does not open quickly enough. There is no need for a second decoupling switch for the last DC/DC converter 41-*n*.

The invention claimed is:

1. An energy transmitter for a battery system, with the energy transmitter comprising a plurality of DC/DC converters in each case having a first and a second input and a first and a second output, with the first output of a first of the plurality of DC/DC converters being connected to a first output of the energy transmitter, and with the second output of the last of the plurality of DC/DC converters being connected to a second output of the energy transmitter, with the first and second inputs being designed for connection of a battery module, and with the plurality of DC/DC converters being connected in series on the output side, and further comprising a plurality of first diodes, in each case one of which has an anode which is connected to the first input of one of the plurality of DC/DC converters, and a cathode which is connected to the second input of another of the plurality of DC/DC converters, such that the plurality of DC/DC converters are connected in series on the input side, and a second diode, which has an anode, which is connected to the first input of the first of the plurality of DC/DC converters, and a cathode which is connected to the first output of the energy transmitter.

2. The energy transmitter of claim 1, further comprising a plurality of first decoupling switches, wherein the battery module is configured to be connected by one of the first decoupling switches to the plurality of DC/DC converters.

3. The energy transmitter of claim 2, in which the first decoupling switches are in the form of relays.

4. The energy transmitter of claim 2, further comprising a plurality of second decoupling switches, one of which is in each case connected in series with the first diodes and the second diode and is designed to decouple the first output of a respective DC/DC converter from the first input of the respective DC/DC converter.

5. The energy transmitter of claim 1, in which the plurality of DC/DC converters are in the form of bi-directional, non-isolating DC/DC converters.

6. The energy transmitter of claim 5, wherein the bi-directional, non-isolating DC/DC converters are step-up/step-down converters or Buck-Boost converters.

7. The energy transmitter of claim 1, in which the DC/DC converters each have a coil, first to fourth switches, and a controller configured to control the first to fourth switches, with the first switch being connected between the first input of the DC/DC converter and a first connection of the coil, with the second switch being connected between the first connection of the coil and the second input of the DC/DC converter, with the third switch being connected between a second connection of the coil and the second input of the DC/DC converter, and with the fourth switch being connected between the second connection of the coil and the first output of the DC/DC converter.

8. The energy transmitter of claim 7, in which each controller has a first control input for a first control signal and is designed to electrically connect the first output of the DC/DC converter to the second output of the DC/DC converter by closing the third switch and the fourth switch (S4), and to decouple the first input of the DC/DC converter by opening the first switch, in response to the reception of the first control signal.

9. The energy transmitter of claim 7, in which each controller has a second control input for a second control signal and is designed to increase a voltage between the first and the second outputs of the DC/DC converter in response to the reception of the second control signal.

10. A battery system, comprising:
an energy transmitter; and
a plurality of battery modules which each have at least one battery cell and battery poles,
wherein the energy transmitter comprises a plurality of DC/DC converters in each case having a first and a second input and a first and a second output, with the first output of a first of the plurality of DC/DC converters being connected to a first output of the energy transmitter, and with the second output of the last of the plurality of DC/DC converters being connected to a second output of the energy transmitter, and with the plurality of DC/DC converters being connected in series on the output side, and further comprising a plurality of first diodes, in each case one of which has an anode which is connected to the first input of one of the plurality of DC/DC converters, and a cathode which is connected to the second input of another of the plurality of DC/DC converters, such that the plurality of DC/DC converters are connected in series on the input side, and a second diode, which has an anode, which is connected to the first input of the first of the plurality of DC/DC converters, and a cathode which is connected to the first output of the energy transmitter, and
wherein the battery poles are detachably connected to a corresponding input of the first and second inputs of one DC/DC converter of the plurality of DC/DC converters of the energy transmitter.

11. A motor vehicle having an energy transmitter, with the energy transmitter comprising a plurality of DC/DC converters in each case having a first and a second input and a first and a second output, with the first output of a first of the plurality of DC/DC converters being connected to a first output of the energy transmitter, and with the second output of the last of the plurality of DC/DC converters being connected to a second output of the energy transmitter, with the first and second inputs being designed for connection of a battery module, and with the plurality of DC/DC converters being connected in series on the output side, and further comprising a plurality of first diodes, in each case one of which has an anode which is connected to the first input of one of the plurality of DC/DC converters, and a cathode which is connected to the second input of another of the plurality of DC/DC converters, such that the plurality of DC/DC converters are connected in series on the input side, and a second diode, which has an anode, which is connected to the first input of the first of the plurality of DC/DC converters, and a cathode which is connected to the first output of the energy transmitter.

* * * * *